United States Patent
Coleman et al.

(10) Patent No.: US 11,860,014 B2
(45) Date of Patent: Jan. 2, 2024

(54) ACOUSTIC SIGNAL DETECTION OF MATERIAL COMPOSITION IN STATIC AND DYNAMIC CONDITIONS

(71) Applicant: PERCEPTIVE SENSOR TECHNOLOGIES, INC., Tucson, AZ (US)

(72) Inventors: William Coleman, Tucson, AZ (US); Martin A Diamond, Tucson, AZ (US); James M. Heim, Tucson, AZ (US); Joel D. Burcham, Huntsville, AL (US); Lazar Bivolarsky, Cupertino, CA (US); James Paladino, Tucson, AZ (US); Earl Crochet, Humble, TX (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 18/109,022

(22) Filed: Feb. 13, 2023

(65) Prior Publication Data

US 2023/0258488 A1      Aug. 17, 2023

Related U.S. Application Data

(60) Provisional application No. 63/309,422, filed on Feb. 11, 2022.

(51) Int. Cl.
  *G01F 1/66* (2022.01)
  *G01F 15/14* (2006.01)
  *G01F 1/667* (2022.01)

(52) U.S. Cl.
  CPC .............. *G01F 1/662* (2013.01); *G01F 1/667* (2013.01); *G01F 15/14* (2013.01)

(58) Field of Classification Search
  CPC ........... G01F 1/662; G01F 1/667; G01F 15/14
  (Continued)

(56) References Cited

U.S. PATENT DOCUMENTS

| 2,449,054 A | 9/1948 | Chantlin | 177/311 |
| 3,019,650 A | 2/1962 | Worswick | 73/290 |

(Continued)

FOREIGN PATENT DOCUMENTS

| CN | 204944617 | 1/2016 | ........... G01F 23/296 |
| CN | 105333925 | 2/2016 | ........... G01F 23/296 |

(Continued)

OTHER PUBLICATIONS

Amjad, Umar et al., "Advanced signal processing technique for damage detection in steel tubes" Proceedings of SPIE, Health Monitoring of Structural and Biological Systems 2016, 980511 (Apr. 1, 2016);14 pgs.

(Continued)

*Primary Examiner* — Nathaniel T Woodward
(74) *Attorney, Agent, or Firm* — HAYES SOLOWAY P.C.

(57) ABSTRACT

Systems and methods for material composition detection includes a vessel containing a quantity of a fluid composition therein which has at least a first and second fluids. At least one acoustic transducer is positioned on an exterior sidewall of the vessel. A computerized device has a processor and is in communication with the acoustic transducer. A metric of a property of the first fluid is determined based on a first signal of the acoustic transducer. A metric of a property of the second fluid is determined based on a second signal of the acoustic transducer. A metric of a property of the fluid composition at a point in time is determined based on the metrics of the first and second fluids, and at least a (Continued)

determinable volume of at least a portion of the vessel. A material identity of the fluid composition is determined at the point in time.

20 Claims, 8 Drawing Sheets

(58) Field of Classification Search
USPC .................................................. 73/861.28
See application file for complete search history.

(56) References Cited

U.S. PATENT DOCUMENTS

| | | | |
|---|---|---|---|
| 3,703,829 A | 11/1972 | Dougherty | 73/290 |
| 3,837,218 A | 9/1974 | Flambard et al. | G01N 29/00 |
| 3,971,962 A | 7/1976 | Green | H01L 41/08 |
| 4,065,958 A | 1/1978 | Krylova et al. | G01N 29/02 |
| 4,118,983 A | 10/1978 | Braznikov | G01F 23/28 |
| 4,121,468 A | 10/1978 | Glover et al. | G01N 29/04 |
| 4,182,177 A | 1/1980 | Prough | 73/290 |
| 4,208,908 A | 6/1980 | Hickox | G01F 1/166 |
| 4,280,126 A | 7/1981 | White | 340/621 |
| 4,320,659 A | 3/1982 | Lynnworth et al. | G01N 29/02 |
| 4,326,173 A | 4/1982 | Newman | H03L 7/08 |
| 4,501,146 A | 2/1985 | Greenhalgh | G01F 23/28 |
| 4,580,448 A | 4/1986 | Skrgatic | G01F 23/28 |
| 4,596,266 A | 6/1986 | Kinghorn et al. | B65D 88/38 |
| 4,599,892 A * | 7/1986 | Doshi | G01F 23/296 |
| | | | 73/149 |
| 4,676,098 A | 6/1987 | Erlenkämper et al. | 73/290 |
| 4,852,416 A | 8/1989 | Boone et al. | H04R 1/02 |
| 4,934,191 A | 6/1990 | Kroening et al. | 73/592 |
| 4,954,997 A | 9/1990 | Dieulesaint et al. | G08B 21/00 |
| 4,977,780 A | 12/1990 | Machida et al. | G01N 29/04 |
| 5,015,995 A | 5/1991 | Holroyd | 340/621 |
| 5,038,611 A | 8/1991 | Weldon et al. | 73/290 |
| 5,040,415 A * | 8/1991 | Barkhoudarian | G01P 5/24 |
| | | | 73/861.03 |
| 5,148,700 A | 9/1992 | King | G01N 15/00 |
| 5,195,058 A | 3/1993 | Simon | G01S 15/02 |
| 5,223,822 A | 6/1993 | Stommes et al. | G08B 7/06 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,453,944 A | 9/1995 | Baumoel | G06F 17/00 |
| 5,460,046 A | 10/1995 | Maltby et al. | G01N 29/24 |
| 5,469,749 A | 11/1995 | Shimada et al. | G01F 1/38 |
| 5,604,314 A | 2/1997 | Grahn | G01L 5/16 |
| 5,770,806 A | 6/1998 | Hiismaki | G01F 1/662 |
| 5,821,427 A | 10/1998 | Byrd | G01F 1/66 |
| 5,836,192 A | 11/1998 | Getman et al. | G01F 23/28 |
| 6,035,903 A | 3/2000 | Few et al. | B65B 1/04 |
| 6,151,956 A | 11/2000 | Takahashi et al. | G01N 3/56 |
| 6,157,894 A | 12/2000 | Hess et al. | 702/54 |
| 6,192,751 B1 | 2/2001 | Stein et al. | G08B 21/00 |
| 6,330,831 B1 | 12/2001 | Lynnworth et al. | 73/861.28 |
| 6,354,147 B1 * | 3/2002 | Gysling | G01N 29/024 |
| | | | 73/61.79 |
| 6,368,281 B1 | 4/2002 | Solomon et al. | A61B 8/14 |
| 6,443,006 B1 | 9/2002 | Degrave | G02F 8/14 |
| 6,470,744 B1 | 10/2002 | Usui et al. | 73/290 |
| 6,481,287 B1 | 11/2002 | Ashworth et al. | G01K 11/24 |
| 6,513,385 B1 | 2/2003 | Han | G01N 29/00 |
| 6,575,043 B1 | 6/2003 | Huang et al. | G01F 1/66 |
| 6,578,424 B1 | 6/2003 | Ziola et al. | G01N 29/00 |
| 6,631,639 B1 | 10/2003 | Dam et al. | 73/290 |
| 6,672,163 B2 | 1/2004 | Han et al. | G01N 1/28 |
| 6,691,582 B1 | 2/2004 | Nawa et al. | G01F 1/66 |
| 6,836,734 B2 * | 12/2004 | Rojas | G01N 29/11 |
| | | | 702/33 |
| 6,925,868 B2 | 8/2005 | Young et al. | 73/290 |
| 6,938,488 B2 | 9/2005 | Diaz et al. | 73/597 |
| 7,085,391 B1 | 8/2006 | Yamaya | G10H 1/00 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,359,803 B2 | 4/2008 | Gysling et al. | G01N 31/00 |
| 7,363,174 B2 | 4/2008 | Kishiro et al. | G01F 25/10 |
| 7,430,924 B2 | 10/2008 | Gysling et al. | G01F 1/00 |
| 7,437,946 B2 | 10/2008 | Gysling et al. | G01F 1/22 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,757,560 B2 * | 7/2010 | Hofmann | G01N 29/44 |
| | | | 73/632 |
| 7,962,293 B2 | 6/2011 | Gysling | G01F 1/76 |
| 7,966,882 B2 | 6/2011 | Greenwood | 73/597 |
| 8,249,829 B2 | 8/2012 | Vass et al. | G06F 19/00 |
| 8,346,491 B2 * | 1/2013 | Loose | G01N 29/024 |
| | | | 702/50 |
| 8,482,295 B2 * | 7/2013 | Sadri | G01F 23/284 |
| | | | 73/304 C |
| 8,683,882 B2 | 4/2014 | Jackson | G01N 9/24 |
| 8,820,182 B2 | 9/2014 | Nikolay Nikolov et al. | H04Q 9/00 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,383,476 B2 * | 7/2016 | Trehan | G01N 33/2823 |
| 9,557,208 B2 * | 1/2017 | Kuroda | G01F 23/2965 |
| 9,772,311 B2 * | 9/2017 | Liljenberg | G01N 29/032 |
| 9,816,848 B2 | 11/2017 | Raykhman et al. | G01F 1/86 |
| 9,891,085 B2 | 2/2018 | Muhammad et al. | G01F 1/88 |
| 9,903,840 B2 | 2/2018 | Altpeter et al. | G01N 29/04 |
| 10,122,051 B2 | 11/2018 | Kuhne et al. | H01M 10/484 |
| 10,215,613 B2 | 2/2019 | Kassubek et al. | G01F 23/296 |
| 10,458,871 B2 | 10/2019 | Norli | G01L 11/04 |
| 10,794,871 B1 | 10/2020 | Blackshire et al. | G01N 29/265 |
| 11,020,793 B2 | 6/2021 | De Monte et al. | B22D 2/006 |
| 11,047,721 B2 | 6/2021 | Schöb et al. | G01F 1/66 |
| 11,274,952 B2 | 3/2022 | Bober et al. | G01F 1/66 |
| 11,293,791 B2 | 4/2022 | Firouzi et al. | G01F 1/66 |
| 11,536,696 B2 | 12/2022 | Bivolarsky et al. | G01N 29/44 |
| 2002/0170753 A1 | 11/2002 | Clare | G01G 19/22 |
| 2002/0173230 A1 * | 11/2002 | Mayes | G01F 23/161 |
| | | | 451/60 |
| 2004/0035208 A1 | 2/2004 | Diaz et al. | G01N 29/18 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0102109 A1 | 5/2005 | Dubois et al. | G01B 5/28 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0001028 A1 | 1/2007 | Gysling | B05B 7/30 |
| 2007/0068248 A1 | 3/2007 | Freger et al. | G01F 23/28 |
| 2007/0068253 A1 | 3/2007 | Carodiskey | A61B 6/00 |
| 2007/0157737 A1 | 7/2007 | Gysling et al. | G01F 1/667 |
| 2007/0205907 A1 | 9/2007 | Schenk, Jr. | G08B 21/00 |
| 2008/0092623 A1 | 4/2008 | Lynch et al. | G01N 29/02 |
| 2008/0101158 A1 | 5/2008 | Hosseini et al. | G01S 15/00 |
| 2009/0143681 A1 | 6/2009 | Jurvelin et al. | A61B 8/00 |
| 2010/0046576 A1 | 2/2010 | Desai | G01K 11/22 |
| 2010/0111133 A1 | 5/2010 | Yuhas et al. | G01K 17/00 |
| 2010/0199779 A1 | 8/2010 | Liu et al. | G01F 1/663 |
| 2010/0218599 A1 * | 9/2010 | Young | G01F 22/00 |
| | | | 73/290 V |
| 2010/0242593 A1 | 9/2010 | Lagergren et al. | G01F 23/296 |
| 2010/0307249 A1 | 12/2010 | Lesage et al. | G01N 29/04 |
| 2011/0029262 A1 | 2/2011 | Barkhouse | 702/55 |
| 2011/0048551 A1 | 3/2011 | Tanaka et al. | 137/486 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 | 3/2012 | Sinha | G01N 29/00 |

(56) References Cited

U.S. PATENT DOCUMENTS

| | | |
|---|---|---|
| 2012/0173169 A1 | 7/2012 | Skelding ............... G06F 19/00 |
| 2012/0222471 A1 | 9/2012 | Raykhman et al. ... G01N 29/02 |
| 2012/0259560 A1 | 10/2012 | Woltring et al. ............... 702/55 |
| 2012/0262472 A1 | 10/2012 | Garr et al. ............ G06T 11/206 |
| 2012/0265454 A1 | 10/2012 | Rudd et al. ............... G01F 1/66 |
| 2012/0281096 A1 | 11/2012 | Gellaboina et al. ..... G01S 15/89 |
| 2013/0002443 A1 | 1/2013 | Breed et al. ........... G08B 21/00 |
| 2013/0068027 A1 | 3/2013 | Sullivan et al. ........ G01N 29/04 |
| 2013/0080081 A1 | 3/2013 | Dugger et al. .......... G01F 1/663 |
| 2013/0090575 A1 | 4/2013 | Rupp et al. .............. A61N 7/00 |
| 2013/0120155 A1 | 5/2013 | Hagg ..................... G08C 19/16 |
| 2013/0128035 A1 | 5/2013 | Johns et al. ................... 348/135 |
| 2013/0213714 A1 | 8/2013 | Fuida ...................... E21B 49/00 |
| 2014/0020478 A1 | 1/2014 | Ao et al. .................. G01F 1/66 |
| 2014/0027455 A1 | 1/2014 | Castellano et al. ..... B65D 88/34 |
| 2014/0076415 A1 | 3/2014 | Dunki-Jacobs et al. .. E03C 1/02 |
| 2014/0107435 A1 | 4/2014 | Sharf et al. .............. A61B 8/00 |
| 2014/0223992 A1 | 8/2014 | Harper et al. ...... G01F 25/0084 |
| 2014/0301902 A1 | 10/2014 | Fernald et al. .......... B01J 19/10 |
| 2014/0375169 A1 | 12/2014 | Na et al. ................. H01L 41/08 |
| 2015/0075278 A1 | 3/2015 | Dockendorff et al. ...................... G01F 23/296 |
| 2015/0177045 A1 | 6/2015 | Cobianu et al. ...... G01F 23/296 |
| 2015/0198471 A1 | 7/2015 | Furlong et al. .......... G01F 1/66 |
| 2015/0212045 A1 | 7/2015 | Raykhman et al. ....... G01F 1/74 |
| 2015/0247751 A1 | 9/2015 | Kutlik et al. ........ G01F 23/2962 |
| 2015/0260003 A1 | 9/2015 | McHugh et al. ..... E21B 33/076 |
| 2015/0276463 A1 | 10/2015 | Milne et al. .......... G01F 23/296 |
| 2015/0369647 A1 | 12/2015 | Kumar et al. ........ G01F 23/284 |
| 2016/0025545 A1 | 1/2016 | Saltzgiver et al. ... G01F 23/263 |
| 2016/0041024 A1 | 2/2016 | Reimer et al. ........ G01F 23/296 |
| 2016/0108730 A1 | 4/2016 | Fanini et al. ........... E21B 49/08 |
| 2016/0109304 A1 | 4/2016 | Yan et al. .............. G01K 15/00 |
| 2016/0146653 A1 | 5/2016 | Skelding ................. E21B 21/01 |
| 2016/0169839 A1 | 6/2016 | Gottlieb et al. ....... G01N 29/02 |
| 2016/0216141 A1 | 7/2016 | Leaders et al. .......... G01F 1/66 |
| 2016/0265954 A1 | 9/2016 | Bachmann et al. .... G01F 1/667 |
| 2016/0320226 A1* | 11/2016 | Schaefer ............. G01F 23/2965 |
| 2017/0002954 A1 | 1/2017 | Brown et al. ....... F16K 37/0058 |
| 2017/0010144 A1 | 1/2017 | Lenner et al. ........ G01F 23/296 |
| 2017/0010145 A1 | 1/2017 | Lenner et al. ....... G01F 23/2962 |
| 2017/0010146 A1 | 1/2017 | Kassubek et al. .. G01F 23/2962 |
| 2017/0059389 A1 | 3/2017 | Moore et al. ....... G01F 23/2968 |
| 2017/0082650 A1 | 3/2017 | Hies et al. .......... G01F 25/0007 |
| 2017/0087526 A1 | 3/2017 | Luharuka ............... B01F 15/00 |
| 2017/0102095 A1 | 4/2017 | Kunita et al. ....... F16K 37/0091 |
| 2017/0097322 A1 | 6/2017 | Giese et al. ........... G01N 29/07 |
| 2017/0199295 A1 | 7/2017 | Mandal .................... G01V 1/50 |
| 2017/0202595 A1 | 7/2017 | Shelton, IV .......... A61B 18/00 |
| 2017/0239741 A1 | 8/2017 | Furuta ..................... B23H 1/10 |
| 2017/0268915 A1 | 9/2017 | Gestner et al. .......... G01F 1/66 |
| 2017/0309989 A1 | 10/2017 | Waelde et al. ......... H01Q 1/225 |
| 2018/0035603 A1 | 2/2018 | Kremmer et al. ....... A01C 7/20 |
| 2018/0044159 A1 | 2/2018 | Crouse et al. ....... B67D 1/0406 |
| 2018/0080809 A1 | 3/2018 | Tokarev et al. ..... G01F 23/2965 |
| 2018/0113663 A1 | 4/2018 | Jain .......................... G06F 3/14 |
| 2018/0149505 A1 | 5/2018 | Ploss et al. ............... G01F 1/66 |
| 2018/0266874 A1 | 9/2018 | Montoya et al. ....... G01F 23/68 |
| 2018/0299317 A1 | 10/2018 | Truong et al. ...... G01F 23/2925 |
| 2018/0306628 A1 | 10/2018 | Parrott et al. .......... G01F 17/00 |
| 2018/0348169 A1 | 12/2018 | Lee et al. ............... G01N 29/11 |
| 2019/0011304 A1 | 1/2019 | Cunningham et al. ...................... G01F 17/00 |
| 2019/0063984 A1 | 2/2019 | Bowley ............... G01F 23/2962 |
| 2019/0078927 A1 | 3/2019 | Takayama et al. ........................... G01F 23/2965 |
| 2019/0137310 A1 | 5/2019 | Xiao et al. ................ G01F 1/06 |
| 2019/0154480 A1 | 5/2019 | Schöb et al. ............ G01F 1/662 |
| 2019/0195629 A1 | 6/2019 | Vaissiere .................. G01C 9/00 |
| 2019/0195830 A1 | 6/2019 | Tamura et al. |
| 2019/0272496 A1 | 9/2019 | Moeller ............... G06Q 10/087 |
| 2019/0368908 A1 | 12/2019 | Aughton et al. .......... G01F 1/66 |
| 2020/0018628 A1 | 1/2020 | Head et al. .......... G21C 17/022 |
| 2020/0182736 A1 | 6/2020 | Kim et al. ........... G01M 3/2807 |
| 2020/0195449 A1 | 6/2020 | Obaidi ..................... H04L 9/38 |
| 2020/0200711 A1 | 6/2020 | Ferhan et al. ....... G01N 29/024 |
| 2020/0378283 A1 | 12/2020 | Zhang et al. .......... F01M 11/10 |
| 2020/0378812 A1 | 12/2020 | Heim ..................... G01F 1/667 |
| 2020/0378818 A1 | 12/2020 | Heim et al. ........... G01F 23/296 |
| 2021/0382014 A1 | 12/2021 | Xu et al. ................ G01N 29/24 |
| 2022/0034850 A1 | 2/2022 | Zhang et al. .......... G01N 29/22 |
| 2022/0178879 A1* | 6/2022 | Bivolarsky ............. G01N 29/07 |
| 2022/0178881 A1 | 6/2022 | Bivolarsky et al. ... G01N 29/04 |
| 2022/0276102 A1 | 9/2022 | Bivolarsky et al. ... G01K 11/24 |

FOREIGN PATENT DOCUMENTS

| | | | |
|---|---|---|---|
| CN | 105548370 | 5/2016 | ............ G01N 29/24 |
| DE | 10 2010 029 254 | 12/2011 | ............... F01N 3/10 |
| EP | 0372700 | 6/1990 | ............ G01F 23/28 |
| EP | 2450701 | 5/2012 | ............ G01N 29/22 |
| EP | 2962096 | 2/2014 | ............ G01N 29/07 |
| EP | 2962096 | 8/2019 | ............. G01L 1/255 |
| GB | 2192717 | 1/1990 | ............ G01N 29/00 |
| JP | H1073385 | 3/1998 | ............ F28D 15/02 |
| JP | 2000314651 | 11/2000 | ............ G01F 23/28 |
| JP | 2002340654 | 11/2002 | ............ G01F 23/28 |
| JP | 2013140029 | 7/2013 | ............... F01K 5/02 |
| KR | 200174618 | 3/2000 | ............ G01N 29/24 |
| SU | WO 87/04793 | 8/1987 | ............ G01N 29/00 |
| WO | WO 8809895 | 12/1988 | ............ F16K 37/00 |
| WO | WO9010849 | 9/1990 | ............ G01F 23/28 |
| WO | WO 2007/149605 | 12/2007 | |
| WO | WO2008079202 | 7/2008 | ............... G01F 3/36 |
| WO | WO 2009/154719 | 12/2009 | ............ G01F 17/00 |
| WO | WO 2014/021846 | 2/2014 | ............... G01F 1/66 |
| WO | WO 2014/167471 | 10/2014 | ............ G01F 23/30 |
| WO | WO 2020/136945 | 7/2020 | ............ G01F 23/296 |

OTHER PUBLICATIONS

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018), 10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasoncis* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring* 2015, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" *Houston Chronicle*, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

(56) References Cited

OTHER PUBLICATIONS

Pluta et al., "Stress Dependent Dispersion Relations of Acoustic Waves Travelling on a Chain of Point Masses Connected by Anharmonic Linear and Torsional Springs" *International Congress on Ultrasonics* AIP Conf. Proc. 1433, 471-474 (2012); 5 pgs.
Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.
"TOPS Terminal Operating Practices Symposium" Program Agenda, Apr. 11, 2018, 1 page.
Zadler, et al., "Resonant Ultrasound Spectroscopy: theory and application", Geophysical Journal International, vol. 156, Issue 1, Jan. 2004, pp. 154-169.
Vermeersch, "Influence of substrate thickness on thermal impedance of microelectronic structures". Microelectronics Reliability, 47, 2007, pp. 437-443.
Examination Report No. 1 issued in Australian Application No. 2020283140 dated Jan. 4, 2022, 6 pgs.
Examination Report No. 1 issued in Australian Patent Application No. 2020302919, dated Feb. 15, 2022, 4 pgs.
International Search Report and Written Opinion issued in PCT/US20/35404, dated Aug. 24, 2020, 11 pages.
International Preliminary Report on Patentability issued in PCT/US20/35404 dated Nov. 16, 2021, 8 pgs.
International Search Report and Written Opinion issued in PCT/US20/39966, dated Sep. 18, 2020, 13 pages.
International Preliminary Report on Patentability issued in PCT/US20/39966 dated Dec. 28, 2021, 10 pgs.
International Search Report and Written Opinion issued in PCT/US21/61962 dated Feb. 16, 2022, 9 pgs.
International Search Report and Written Opinion issued in PCT/US21/61924 dated Feb. 16, 2022, 9 pgs.
International Search Report and Written Opinion issued in PCT/US21/62010 dated Feb. 16, 2022, 9 pgs.
International Search Report and Written Opinion issued in PCT/US21/61970 dated Feb. 18, 2022, 17 pgs.
International Search Report and Written Opinion issued in PCT/US21/61925 dated Feb. 18, 2022, 9 pgs.
International Search Report and Written Opinion issued in PCT/US21/61646 dated Feb. 25, 2022, 9 pgs.
International Search Report and Written Opinion issued in PCT/US21/65664 dated Mar. 11, 2022, 9 pgs.
International Search Report and Written Opinion issued in PCT/US21/62001 dated Mar. 9, 2022, 9 pgs.
International Search Report and Written Opinion issued in PCT/US21/61926 dated Mar. 8, 2022, 9 pgs.
Notice of Allowance issued in U.S. Appl. No. 16/888,469, dated Dec. 23, 2020, 16 pgs.
Notice of Allowance issued in U.S. Appl. No. 17/148,122 dated Jun. 16, 2021, 8 pgs.
Notice of Allowance issued in U.S. Appl. No. 16/914,092 dated Oct. 28, 2021, 14 pgs.
Notice of Acceptance issued in Australian Application No. 2020302919 dated Mar. 2, 2022, 4 pgs.
Notice of Acceptance issued in Australian Application No. 2020283140 dated Mar. 30, 2022, 4 pgs.
Notice of Allowance issued in Canadian Application No. 3,140,008 dated May 5, 2022, 1 pg.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Notice of Allowance issued in U.S. Appl. No. 17/543,152, dated Jul. 29, 2022, 16 pages.
Notice of Allowance issued in U.S. Appl. No. 17/542,461, dated Oct. 12, 2022, 9 pages.
Notice of Allowance issued in U.S. Appl. No. 17/543,200, dated Nov. 3, 2022, 16 pages.
Notice of Allowance issued in U.S. Appl. No. 17/746,622, dated Nov. 8, 2022, 16 pages.
Notice of Allowance issued in U.S. Appl. No. 17/540,021, dated Mar. 6, 2023, 10 pgs.
Notice of Allowance issued in U.S. Appl. No. 17/541,036, dated Mar. 31, 2023, 9 pgs.
Office Action issued in Australian Patent Application No. 2020283140, dated Mar. 18, 2022, 5 pgs.
Office Action issued in Canadian Patent Application No. 3,140,008, dated Feb. 14, 2022, 4 pgs.
Office Action issued in U.S. Appl. No. 16/888,469, dated Aug. 5, 2020, 8 pages.
Office Action issued in U.S. Appl. No. 16/888,469, dated Sep. 8, 2020, 20 pages.
Office Action issued in U.S. Appl. No. 16/914,092, dated Nov. 10, 2020, 22 pgs.
Office Action issued in U.S. Appl. No. 16/914,092, dated Mar. 1, 2021, 25 pgs.
Office Action issued in U.S. Appl. No. 16/914,092, dated Jun. 24, 2021, 24 pgs.
Office Action issued in U.S. Appl. No. 17/148,122, dated Mar. 2, 2021, 26 pgs.
Office Action issued in U.S. Appl. No. 17/543,200, dated Mar. 9, 2022, 8 pages.
Office Action issued in U.S. Appl. No. 17/542,465, dated Mar. 11, 2022, 22 pages.
Office Action issued in U.S. Appl. No. 17/542,461, dated Mar. 10, 2022, 18 pages.
Office Action issued in U.S. Appl. No. 17/542,872, dated Mar. 17, 2022, 22 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
Office Action issued in U.S. Appl. No. 17/542,462, dated May 27, 2022, 28 pages.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/541,036, dated Aug. 9, 2022, 22 pages.
Office Action issued in U.S. Appl. No. 17/746,640, dated Aug. 18, 2022, 19 pages.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Office Action issued in U.S. Appl. No. 17/542,462, dated Nov. 14, 2022, 11 pgs.
Office Action issued in U.S. Appl. No. 17/566,020, dated Nov. 14, 2022, 21 pgs.
Office Action issued in U.S. Appl. No. 17/542,462, dated Mar. 17, 2023, 11 pgs.
Office Action issued in U.S. Appl. No. 17/566,020, dated Apr. 3, 2023, 20 pgs.
Office Action issued in U.S. Appl. No. 17/542,814, dated Apr. 6, 2023, 17 pgs.
Supplementary Partial EP Search Report issued in EP20 813 097.1, dated Jan. 13, 2023, 16 pgs.
U.S. Appl. No. 17/540,021, filed Dec. 1, 2021, Heim et al.
U.S. Appl. No. 17/541,036, filed Dec. 2, 2021, Heim et al.
U.S. Appl. No. 17/746,640, filed May 17, 2022, Bivolarsky et al.
International Search Report and Written Opinion issued in PCTUS23/12923 dated May 3, 2023, 9 pgs.

(56) References Cited

OTHER PUBLICATIONS

Notice of Allowance issued in U.S. Appl. No. 17/746,640, dated May 12, 2023, 15 pgs.
Office Action issued in U.S. Appl. No. 18/111,376, dated Jun. 15, 2023, 28 pgs.
Office Action issued in U.S. Appl. No. 17/566,020, dated Jul. 14, 2023, 20 pgs.
Office Action issued in U.S. Appl. No. 17/542,814, dated Jul. 19, 2023, 25 pgs.
Supplementary European Search Report issued in EP Application No. 20 813 097.1, dated May 24, 2023, 20 pgs.
Supplementary Partial European Search Report issued in EP Application NAo. 20 832 739.5, dated May 25, 2023, 16 pgs.
International Search Report and Written Opinion issued in PCT/US23/022505 dated Jul. 21, 2023, 9 pgs.
International Search Report and Written Opinion issued in PCT/US23/022511 dated Jul. 28, 2023, 14 pgs.
Office Action issued in U.S. Appl. No. 17/542,462, dated Sep. 6, 2023, 11 pgs.
European Search Report issued in EP Application No. 20832739.5, dated Sep. 6, 2023, 14 pgs.
U.S. Appl. No. 17/542,814, filed Dec. 6, 2021, Burcham et al.
U.S. Appl. No. 18/111,376, filed Feb. 17, 2023, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.
U.S. Appl. No. 18/142,467, filed May 2, 2023, Heim et al.
U.S. Appl. No. 18/223,987, filed Jul. 19, 2023, Bivolarsky et al.
Office Action issued in U.S. Appl. No. 17/566,020, dated Oct. 23, 2023, 8 pgs.

* cited by examiner

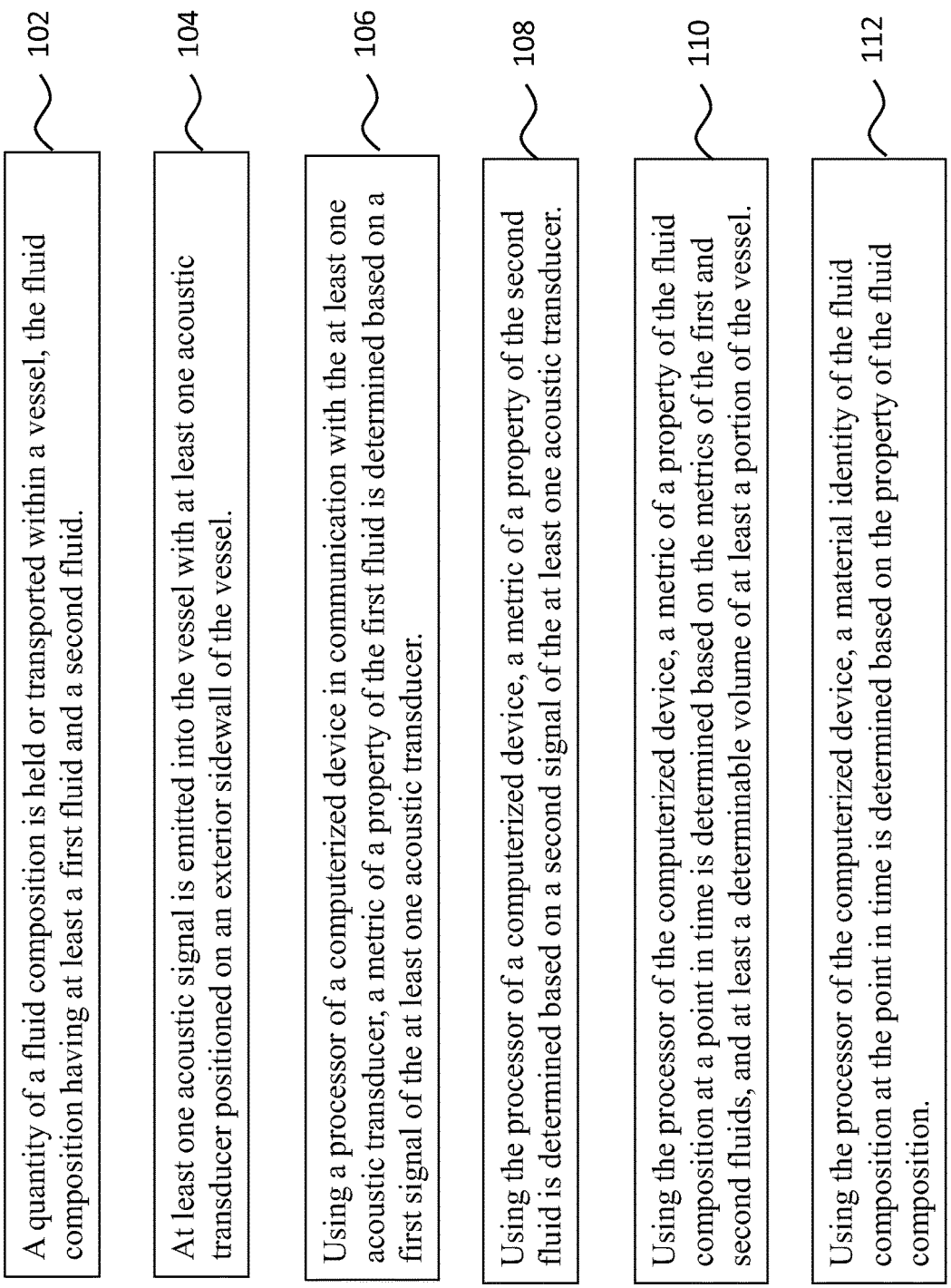

ACOUSTIC SIGNAL DETECTION OF MATERIAL COMPOSITION IN STATIC AND DYNAMIC CONDITIONS

CROSS REFERENCE TO RELATED APPLICATION

This application claims benefit of U.S. Provisional Application Ser. No. 63/309,422 entitled, "Acoustic Signal Detection of Material Composition in Static and Dynamic Conditions" filed, Feb. 11, 2022, the entire disclosure of which is incorporated herein by reference.

FIELD OF THE DISCLOSURE

The present disclosure is generally related to acoustic signal material detection, and more particularly is related to acoustic signal detection of material composition in static and dynamic conditions.

BACKGROUND OF THE DISCLOSURE

Pipes and pipelines are commonly used in a variety of industries to transport fluids and gasses. For instance, water pipes transport potable and sewer water in urban areas, pipes are used to transport chemicals within factories, and pipelines are used within the oil and gas industry for transporting petroleum products within refineries or between various locations. To monitor the fluid within the pipes and pipeline, conventional technologies such as pressure gauges and various sensors are commonly used. More recently, acoustic-based sensors have been used to monitor the fluid or determine characteristics of the fluid.

For instance, acoustic signals are commonly used in assessing fluids and other materials within containers, such as containers and pipelines used to store oil and gas within the petroleum industry. There are many reasons to use acoustic waves for measurements of fluids or materials in a container or other type of enclosure. For instance, some containers are not easily accessible, such as underground storage tanks and large, multi-story fuel storage containers. Acoustic waves for measurements are also especially useful for metal enclosures and other non-transparent enclosures that encapsulate potentially hazardous materials, such as oil, gas, fuel, and various chemicals at different temperatures. These may be prevalent in processing plants, food industry plants, nuclear power stations, power grid transformers, and refineries.

However, despite the ability to use acoustic signals for assessing fluids and materials, there are still further areas where acoustic signal processing of assessing fluids can provide benefits to various industries. Thus, a heretofore unaddressed need exists in the industry to address the aforementioned deficiencies and inadequacies.

SUMMARY OF THE DISCLOSURE

Embodiments of the present disclosure provide a system for material composition detecting using acoustic signals. Briefly described, in architecture, one embodiment of the system, among others, can be implemented as follows. A system for material composition detection has a vessel holding or transporting a quantity of a fluid composition therein, the fluid composition having at least a first fluid and a second fluid. At least one acoustic transducer is positioned on an exterior sidewall of the vessel. A computerized device has a processor. The computerized device is in communication with the at least one acoustic transducer. At least one metric of a property of the first fluid is determined by the computerized device based on a first signal of the at least one acoustic transducer. At least one metric of a property of the second fluid is determined by the computerized device based on a second signal of the at least one acoustic transducer. At least one metric of a property of the fluid composition at a point in time is determined by the computerized device based on the metrics of the first and second fluids, and at least a determinable volume of at least a portion of the vessel, wherein a material identity of the fluid composition is determined at the point in time.

The present disclosure can also be viewed as providing a system for material composition detection. Briefly described, in architecture, one embodiment of the system, among others, can be implemented as follows. The system for material composition detection has a vessel containing a quantity of a material composition therein, the material composition having at least a first material and a second material. At least one acoustic transducer is positioned on an exterior sidewall of the vessel. A computerized device has a processor. The computerized device is in communication with the at least one acoustic transducer. At least one metric of a property of the first material is determined by the computerized device based on a first signal of the at least one acoustic transducer. At least one metric of a property of the second material is determined by the computerized device based on a second signal of the at least one acoustic transducer. At least one metric of a property of the material composition at a point in time is determined by the computerized device based on the metrics of the first and second materials, and at least a determinable volume of at least a portion of the vessel, and wherein a material identity of the material composition is determined at the point in time.

The present disclosure can also be viewed as providing methods for material composition detection. In this regard, one embodiment of such a method, among others, can be broadly summarized by the following steps: holding or transporting a quantity of a fluid composition within a vessel, the fluid composition having at least a first fluid and a second fluid; emitting at least one acoustic signal into the vessel with at least one acoustic transducer positioned on an exterior sidewall of the vessel; and determining, using a processor of a computerized device in communication with the at least one acoustic transducer, at least one metric of a property of the first fluid based on a first signal of the at least one acoustic transducer; determining, using the processor of a computerized device, at least one metric of a property of the second fluid based on a second signal of the at least one acoustic transducer; determining, using the processor of the computerized device, at least one metric of a property of the fluid composition at a point in time based on the metrics of the first and second fluids, and at least a determinable volume of at least a portion of the vessel; and determining, using the processor of the computerized device, a material identity of the fluid composition at the point in time based on the property of the fluid composition.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 8 is a flowchart illustrating a method for material composition detection, in accordance with embodiments of the disclosure.

DETAILED DESCRIPTION

Figure 1:
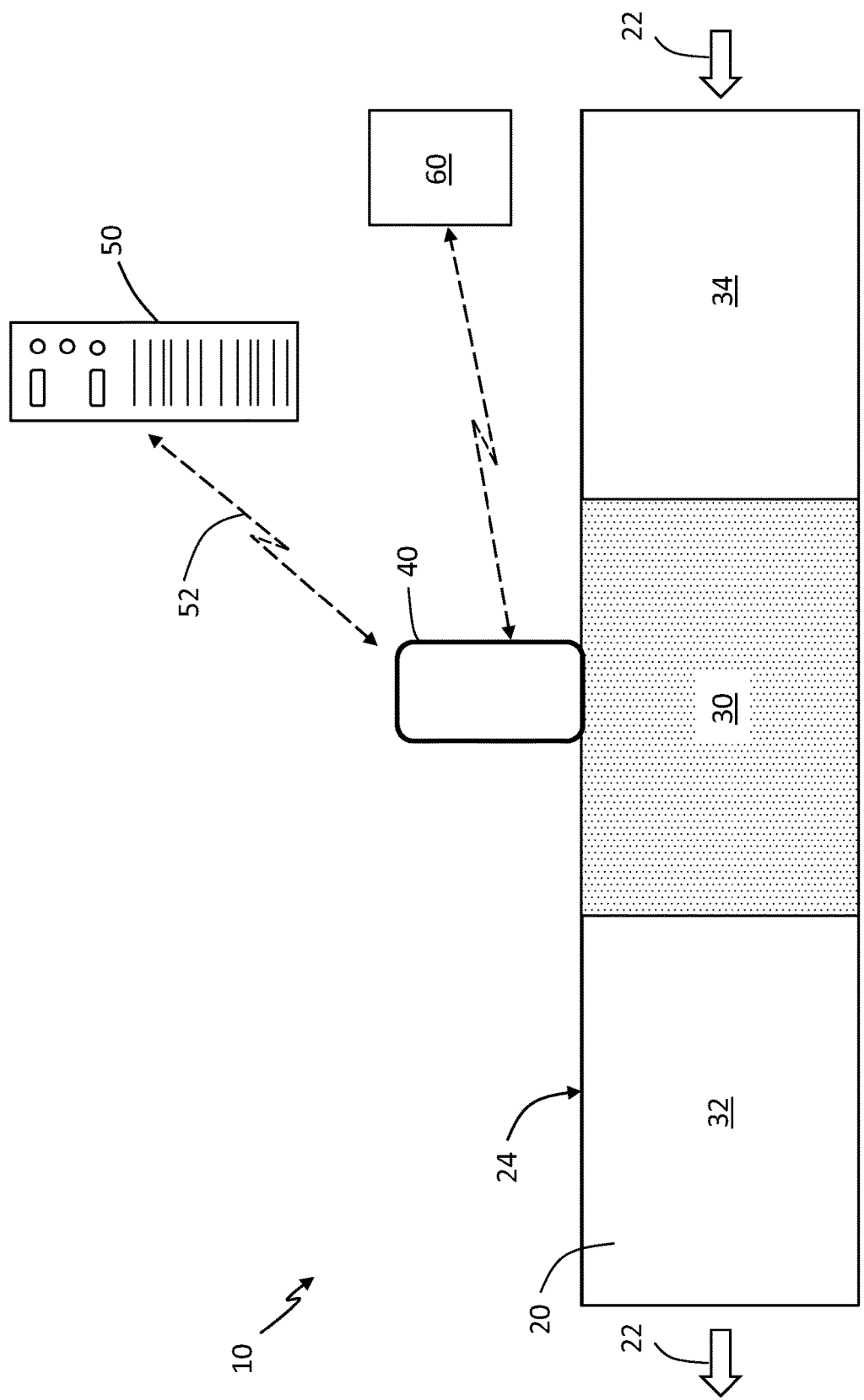
FIG. 1 is a diagrammatical illustration of a system for material composition detection, in accordance with embodiments of the present disclosure.

The subject disclosure is directed to a system for material composition detection using acoustic signals, which provides benefits in any industry where the determination or detection of a material composition is desired. For example, within the petroleum industry, pipelines are used to transport fuels between various locations, and the same pipeline is often used to transport different types of fuels at different times, but with continuous operation. For instance, a pipeline may first transport a quantity of diesel fuel between two locations and then transport a quantity of jet fuel through the pipeline immediately thereafter, such that there is no gap or separation between the diesel fuel and the jet fuel. This creates a situation where a portion of the diesel fuel transported initially mixes or blends with the portion of the jet fuel sent afterwards, and this mixture of the two different substances may be understood as a composition of materials. The material or materials may include various types of materials, such as fluids, gasses, solids, semi-solids, materials in other states. In accordance with this disclosure, fluid materials are used for clarity in disclosure, where a fluid composition may be any mixture of two or more identifiably different substances which are blended or combined together into a substantially homogeneous fluid. Other materials which are non-fluids may also be used.

While some fluid compositions formed from the blending of two or more fluids can be used in the blended state, such as certain octanes of gasoline, it is often the case that the fluid composition must be separated such that the pure fluids from which the composition is formed can be used, identified, or otherwise obtained separately, i.e., the pure diesel fuel and the pure jet fuel in the running example. For instance, the turbine blades used with jet engines will succumb to degradation and premature failure if a mixture of jet fuel and diesel fuel are used with the engine, so it is important to ensure that jet fuel is not contaminated with diesel fuel. There are numerous other examples in a variety of other industries showing why a blend or composition of fluids cannot be used. Conventionally, to prevent this problem from occurring, a pipeline operator must take periodic and frequent physical samples of the fluid within the pipeline to determine when the beginning of the fluid composition and the end of the fluid composition, such that the portion of the fluid within the pipeline can be appropriately identified and separated from the pure fluids.

The system for material composition detection using acoustic signals of the present disclosure provides significant improvements over conventional techniques since it allows for the detection of the material composition without needing to conduct periodic, physical sampling or other intrusive, time-consuming, or laborious techniques. Moreover, the system also allows material composition detection to a high degree of accuracy such that one can better control the use and processing of fluids. Thus, the system for material composition detection can provide substantial benefits over the current use of devices in the industry of fluid composition detection.

With reference to the figures, FIG. 1 is a diagrammatical illustration of a system for material composition detection 10, in accordance with embodiments of the present disclosure. The system for material composition detection 10, which may be referred to simply as 'system 10' may be used for material composition detection using only a signal transducer. As shown, the system 10 includes a vessel 20 holding or transporting a quantity of a fluid composition therein 30. In one example, the vessel 20 may ideally have no or very little materials in a gas state, such as atmospheric air, whereas in other examples, the vessel 20 may also contain gas or solid materials in addition to the fluids. As shown, the vessel 20 is depicted as a pipeline having a fluid flow direction 22 which moves through the vessel 20. In other examples, the vessel 20 may include other types of containment structures, such as containers, tanks, pools, or similar structures, or combinations thereof.

In the example of FIG. 1, the fluid composition 30 may be formed from a first fluid 32 which has flowed through the vessel 20 first, and a second fluid 34 which is flowing through the vessel 20 second, whereby the fluid composition 30 is a blend, mixture, or similar integration of the first and second fluids 32, 34. At least one acoustic transducer 40 is positioned on an exterior sidewall 24 of the vessel 20, such as by being attached, connected, or otherwise positioned proximate to the exterior sidewall 24 of the vessel 20 in any location, such as on the top, bottom, side, or otherwise. When multiple transducers 40 are used, they may be placed in a linear path along the vessel 20, about a circumference of the vessel 30, spiral around the vessel 20, or in other configurations. The transducer 40 is in communication with a computerized device 50 having a data processor and a non-transitory memory through any wired or wireless communication connection 52. Additionally, the transducer 40 may be in communication with a pump 60, either directly or indirectly through the computerized device 50, or through another device, where the pump 60 is controlling a movement or flow of at least a portion of the fluid through the vessel 20.

At least one metric or parameter of one or more property or properties of the first and second fluid 32, 34 may be used to determine the identity of the fluid composition, such as through known methodologies, where the determination of the metric of the fluid 32, 34 may be used to get baseline data about the fluids 32, 34. For instance, the metric may include representative signal data which indicates a property such as a density of the fluids, a weight of the fluid, a temperature of the fluid, or another metric, or a combination thereof, as described further herein. For clarity in disclosure, a determination of the density of the fluid 32, 34 is used as an example within this disclosure, but other metrics or parameters may also be used. For example, densities in a static scenario may be either known in advance or measured before the fluids are mixed in the vessel 20, whereby one or more transducers 40 can be attached to the vessel 20 before the mixing of the fluids 32, 34. For instance, the fluids 32, 34 can simply have properties, such as density, determined beforehand or the density may be known. It is also possible for one of the two or more fluids to be known and the other not known, but detectable by the transducer 40, or by other means.

In a different example, within the vessel, as the fluid moves through the vessel 20, the transducer 40 may emit a first acoustic signal into the vessel 20, either continuously, periodically, or at one or more points in time, where the signal is received within the transducer or another transducer, and the signal data is used to determine a density and/or a weight of the first fluid 32. The determination of the density and/or weight of the first fluid 32 in this example, may be determined with a processor of the computerized device 50 or using another processing device. With the signal emission, the transducer 40 may emit continuous signals into the vessel which continuously identify the fluid therein as the first fluid 32. When the trailing portion of the first fluid 32 moves past the transducer 40, it may detect, with acoustic signals, a change in the material density or weight of the fluid in the vessel 20, since it is starting to detect the fluid composition 30. Similarly, as the trail end of the fluid composition 30 passes by the transducer 40, it may then detect a change to the second fluid 34, where the acoustic signals is capable of determining the weight or density of the second fluid 34.

The moving speed of the fluid 32, 34 through the vessel 20 may be controlled by the pump 62 which is attached to the same vessel 20 which may or may not be used to provide an additional information of the flow of material through the vessel 20. As described further relative to FIGS. 3-4, the flow of the fluid 32, 34 within the vessel 20 may not be laminar, but may be turbulent in nature and the fact that there is the ability to constantly measure the fluid parameter may provide the opportunity to accurately estimate the volume of each type of fluid 32, 34 that passed through the vessel 20 in a mixed state of the fluid composition 30.

With the weight and/or density of the first and second fluids 32, 34 known, or determinable by signal processing within the computerized device, a density of the fluid composition 30 at a point in time can be determined, which can be used to identify the material identity of the fluid composition 30 at that point in time. In particular, and in a simplistic example, the volume of the vessel 20, or a measured portion of the vessel 20 is known or determinable, and the pressure and temperature of the fluid within the vessel 20 is known. With this information, the transducer 40 may be able to detect the combined material density of the composition 30 based on the known densities of the first and second fluids 32, 34, and the portion of the volume of the vessel 20 that each of the first and second fluids 32, 34 in the composition 30 occupies.

It is noted that the system may utilize various metrics of the fluids, such as the densities of the first and second fluids 32, 34, but other metrics, parameters, or features of the fluids 32, 34 may also be used. For instance, it may be possible to utilize the weight or acoustic velocity of the fluids 32, 34, or to use other parameters or combinations of parameters, such as resonance features, attenuation, impedance, absorption spectra, material density measurements, mass, temperature, pressure, volume, or any combination thereof.

The material properties metric may be collected for different material conditions and signal variations to create extensive functional dependency between the material properties between the fluid components and the acoustic signal. Processing of these dependencies may allow for the determination of the fluid composition in both dynamic and static cases. For example, the use of multiple metrics may be used in the case where the components are known and one is only trying to determine their concentration. Also it is possible to use them in unknown components to determine their identity and concentration. In the case of unknown components, it may be necessary to use multiple metrics that can identity material properties so the identification of materials and concentrations can be made.

There may be multiple applications where blends of fluids or other materials are placed in a fixed volume container and the blend of the materials placed in the fixed volume container varies by weight. This scenario can be understood by the equation: $x*A+y*B+z*C=D$, where x, y, and z are percentages of the volume and A, B and C are material densities or weights of the individual fluids, per volume, which comprise the fluid blend density or weight, D. With this information, it is possible to identify the density or weight of the fluid blend, D, by measuring the new density and volume of the container as well as temperature and pressure, since each fluid occupies specific volume at specific temperature and specific pressure. Since the volume can be measured and the density can be measured as well, it is possible to identify the mass of the blend or composition of material within the container.

As an example, consider two materials which are common in the petroleum industry: crude oil and paraffine wax. Paraffine wax is often present in the crude oil extraction process, such that it is common to have a blend of crude oil with paraffine wax. The density of paraffine wax is approximately 930.0 kg/m$^3$ and the density of crude oil is approximately 870.0 kg/m$^3$. In this example, 2 cubic meters of volume is determined as a cross-section of a portion of a pipeline, and the pressure and temperature of the crude oil with paraffine wax mixture are known. If, of the 2 cubic meters, 1.8 cubic meters consists of crude oil and 0.2 cubic meters consists of paraffine wax, at a given temperature of 68° F., a density of the composition of crude oil and paraffine wax can be determined by adding the weight of the components and dividing it by the volume. For instance: $(870*1.8+930*0.2)/2=876$ kg/m$^3$. Thus, the density of the fluid composition is 876 kg/m$^3$, the value of which can then be used to determine the material identity of the composition using known methods.

It is noted that FIG. 1 is described as detecting a material identity of the fluid composition at a point in time, but with multiple iterations of the process described, it is possible to detect material identity of the fluid composition over a longer period of time, such that it is possible to see how the fluid composition changes over that period of time.

Figure 2:
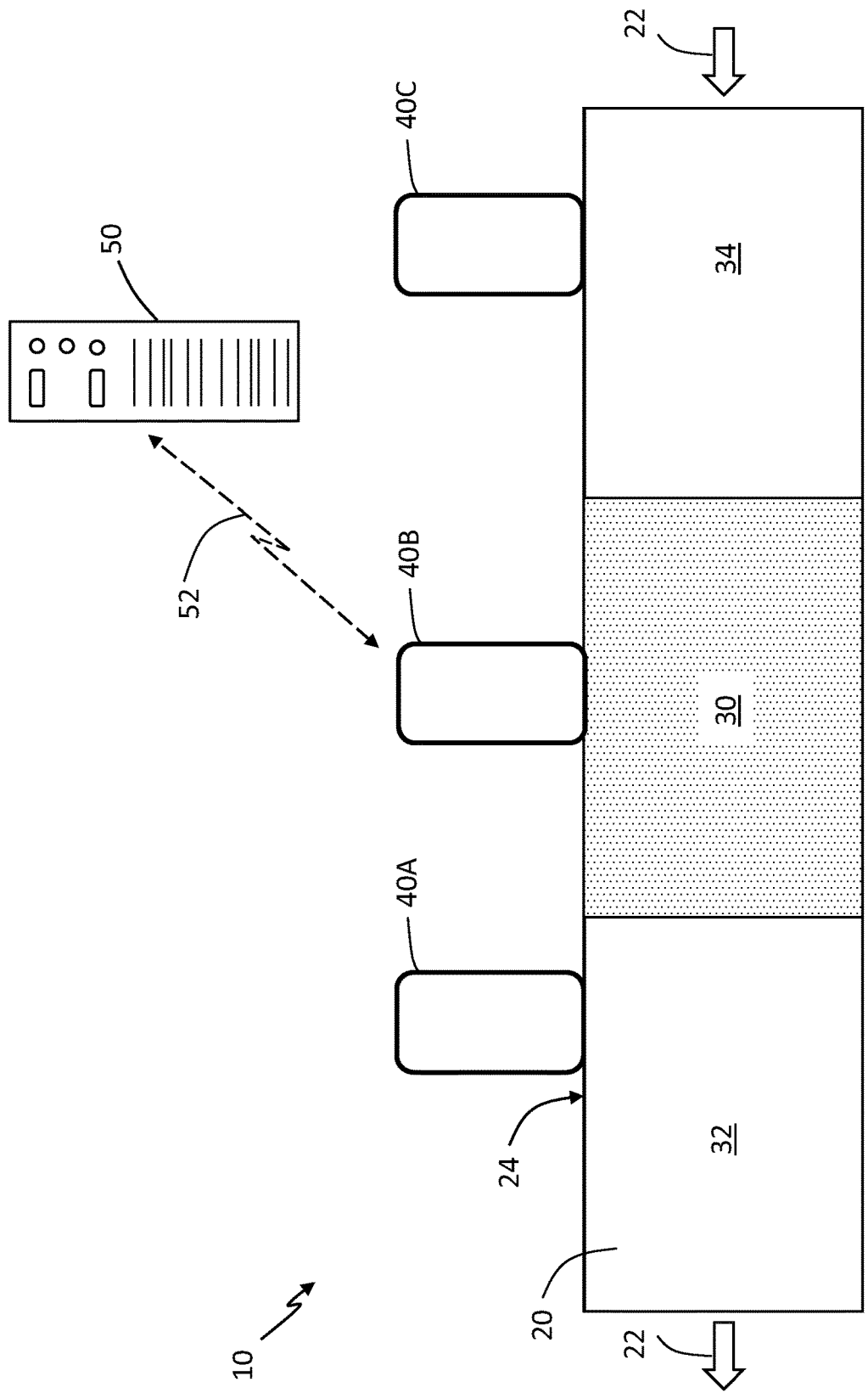
FIG. 2 is a diagrammatical illustration of a system for material composition detection, in accordance with embodiments of the present disclosure.

While FIG. 1 utilizes a single transducer 40 which is in communication with a pump 60, FIG. 2 is directed to an example which utilizes multiple transducers. For example, in FIG. 2, a vessel 20, depicted as a pipeline, is provided with the same fluids 32, 34 and fluid composition flowing through the vessel 20 in the same direction 22 as in FIG. 1. Positioned on or proximate to the vessel 20 are a plurality of transducers 40A-40C, such as three transducers. It is noted that any number of transducers 40 can be used. The operation of the system 10 in FIG. 2 may be similar to that in FIG. 1, but because multiple transducers 40A-40C are used, it is possible to determine the flow rate of the fluid through the vessel 20, using known methods, without having a connection to the pump. Additionally, the use of multiple transducers 40A-40C may allow for the ability to conduct dynamic material detection.

For instance, when using three transducers 40A-40C, as shown in FIG. 2, it is possible to position the transducers on the vessel 20 with spacing which correlates or substantially aligns to the first fluid 32, the second fluid 34, and the fluid composition 30 within the vessel 20. As the fluids move through the vessel 20 in the direction indicated at 22, all three transducers 40A-40C, or a portion of a greater number of transducers, may detect only the first fluid 32. When the fluid composition 30 comes into range of the transducers 40A-40C, transducer 40C may start to detect the fluid composition 30 while transducers 40A-40B continue to detect the first fluid 32 only. Eventually, the fluid movement through the vessel 20 will correspond to the depicted diagram in FIG. 1, where the first fluid 32 corresponds to the location of transducer 40A, the fluid composition 30 corresponds to transducer 40B, and the second fluid 34 starts to be identified by transducer 40C. And, as the fluid moves through the vessel 20, eventually the first fluid 32 and the fluid composition 30 will pass by all transducers such that all transducers 40A-40C detect only the second fluid 34.

While this fluid movement is occurring, the transducers 40A-40C can initiate fluid detection continuously, at predetermined times, or at any given time period, such that material identity of the fluids within the vessel 20 can be determined. Over a period of time, it is possible to correlate these different detections of the fluid to identify the change over time of the fluid as it moves through the vessel 20. For instance, the transducers 40A-40C can determine the start of the fluid composition 30 and the end of the fluid composition 30, namely, by identifying when the pure fluid properties of the first fluid 32 start to change, and when the fluid properties of the second fluid 34 reach pure or nearly pure levels. This allows the system 10 to effectively determine the region within the vessel 20 that contains the fluid composition 30, as well as the specific formulation or concentration of the fluid composition 30.

Figure 3:
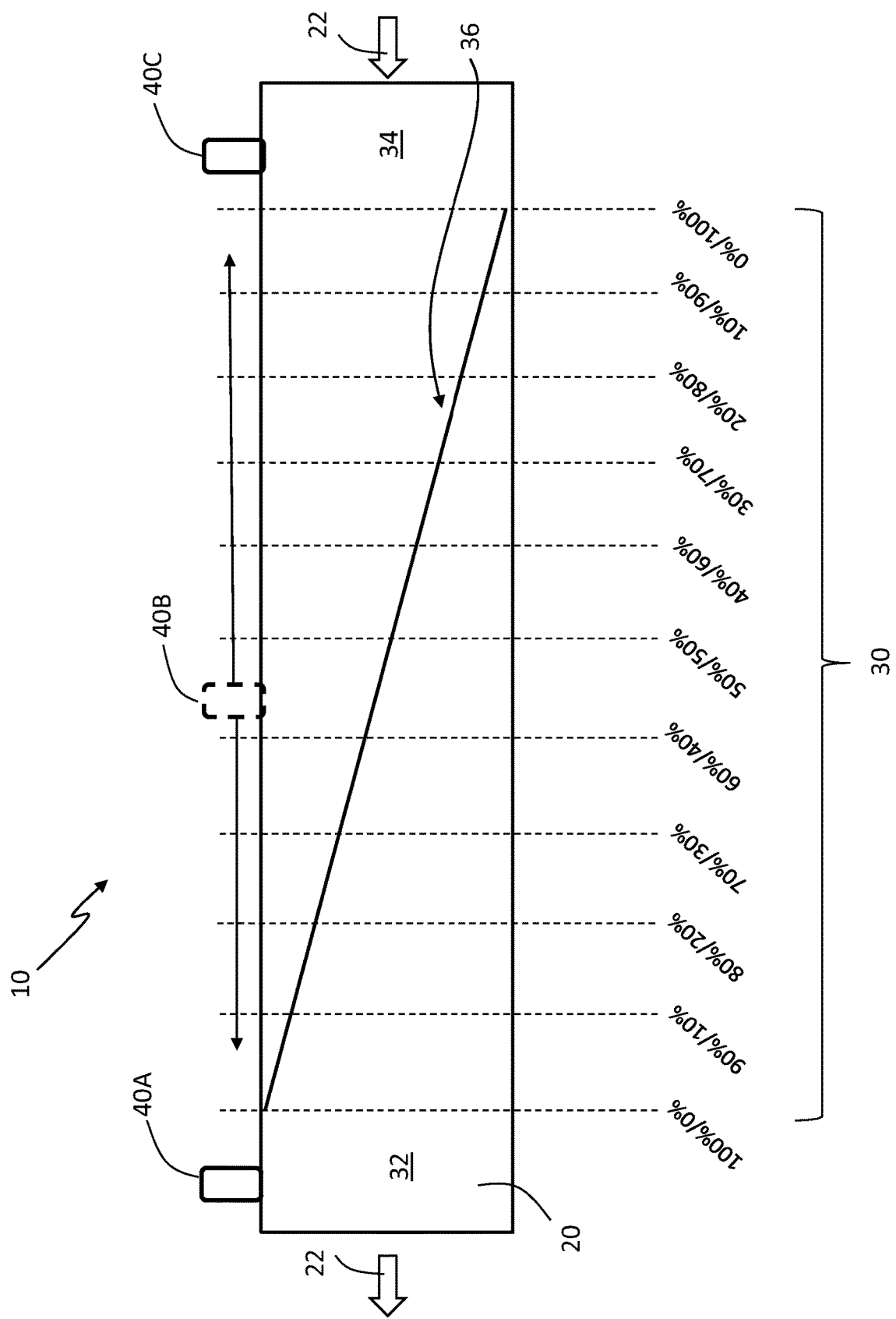
FIG. 3 is a diagrammatical view illustration of the system for material composition detection of FIGS. 1-2, in accordance with embodiments of the present disclosure.

FIG. 3 is a diagrammatical view illustration of the concept described relative to FIG. 2. In FIG. 3, a vessel 20 has first and second fluids 32, 34 flowing in the direction of 22 through the vessel 20, where the fluid composition 30 is depicted as changing percentages of the first fluid 32 relative to the second fluid 34 at discrete points. For instance, the fluid composition 30 changes from a blend of nearly 100% the first fluid 32 to nearly 0% the second fluid 34 on the left-hand side of FIG. 3, to substantially 50% the first fluid 32 and second fluid 34 in the middle, to a blend of nearly 0% the first fluid 32 to nearly 100% the second fluid 34 on the right-hand side of FIG. 3. In this representation, the change of the fluid blend of the composition is depicted as being linear, with the blend line 36 indicating the mathematical separation between the first and second fluids 32, 34 in the composition 30.

Using the system 10 as described herein, it is possible to determine the specific composition or blend of the first and second fluids 32, 34 at any point along the fluid composition 30 portion as it moves through the vessel 20. This means that the system 10 can indicate when the fluid within the vessel 20 is no longer purely the first fluid 32, or when it returns to only the second fluid 34, such that operators of the vessel 20 can take appropriate actions to separate the fluid composition 30 from the first and second fluids 32, 34. Similarly, for fluids which are not required to be used in their pure or nearly pure states, it is possible for the system 10 to detect when a desired level of purity is reached. For instance, in some applications, it may be admissible for the first fluid 32 to contain up to 10% of the second fluid 34, such that the system 10 can indicate when the 90%/10% concentration of the first to second fluid 32, 34 is reached.

Figure 4:
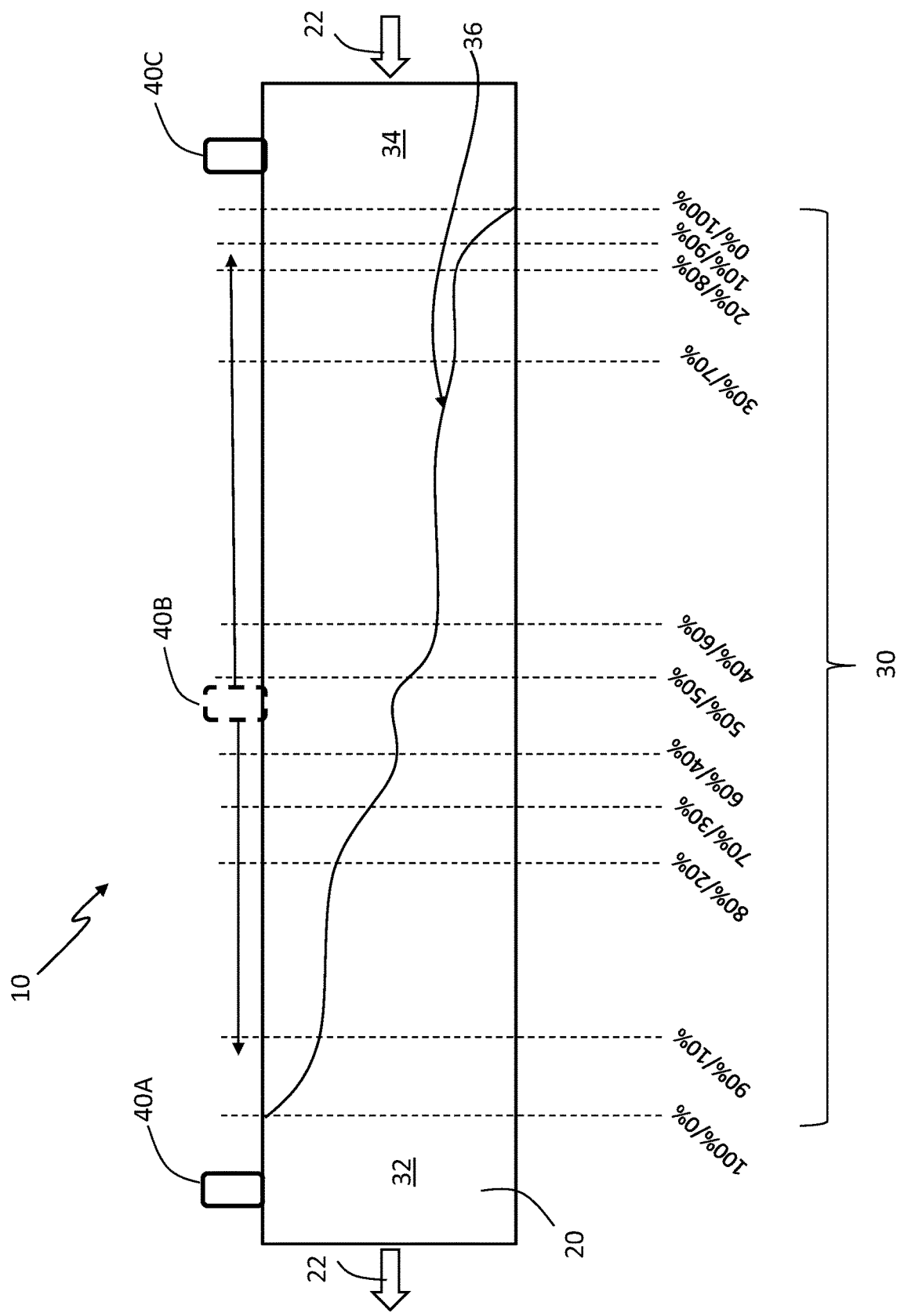
FIG. 4 is a diagrammatical view illustration of the system for material composition detection of FIGS. 1-2, in accordance with embodiments of the present disclosure.

FIG. 4 illustrates a similar example to that of FIG. 3, however, instead of the change in blend of the fluid composition 30 being linear, the change is non-linear. For instance, as shown, the percentage concentration or change of the fluids 32, 34 may vary based on turbulent or non-laminar flow of the fluids 32, 34 through the vessel 20. The system 10 can make periodic measurements using the transducers 40A-40C at any given time interval, such that the system 10 can detect the concentration level of the fluids 32, 34 as it changes in a non-linear manner.

Figure 5:
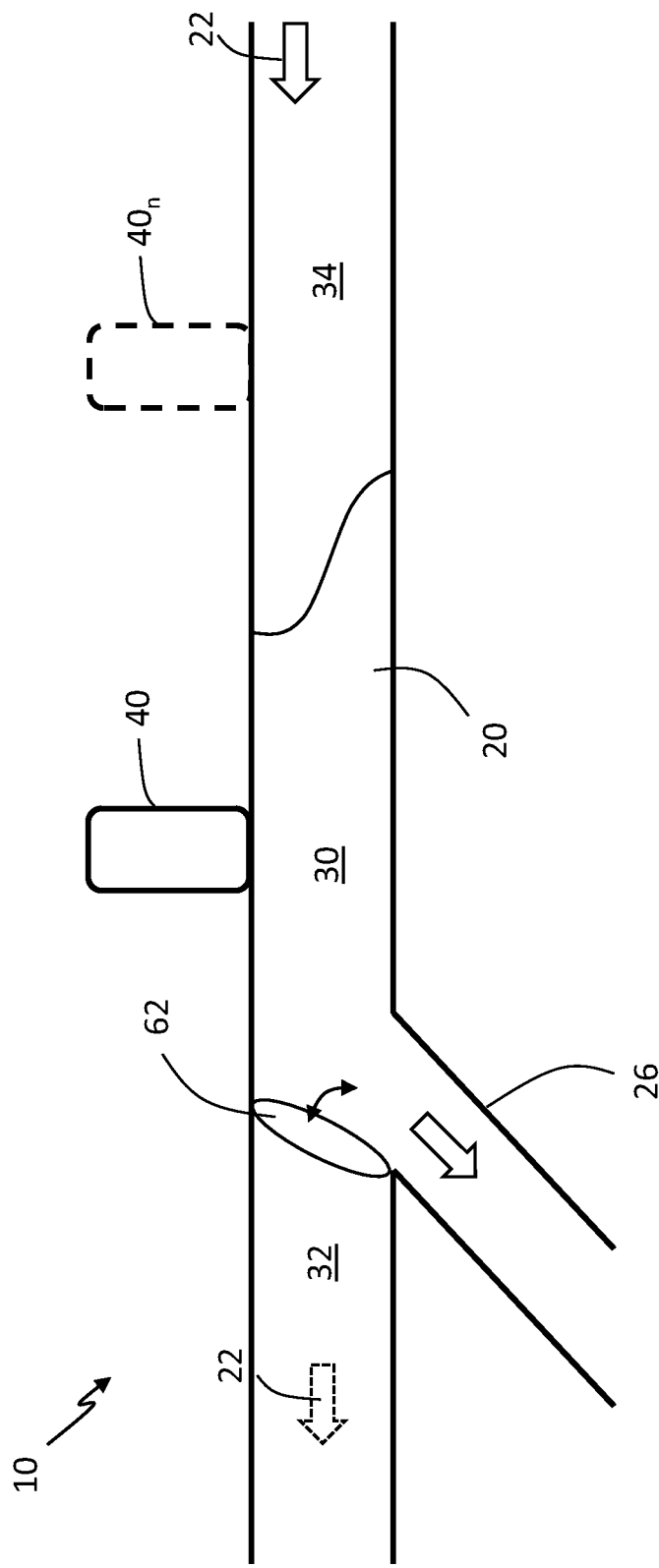
FIG. 5 is a diagrammatical cross-sectional view illustration of an application of the system for material composition detection of FIGS. 1-2, in accordance with embodiments of the present disclosure.
Figure 6:
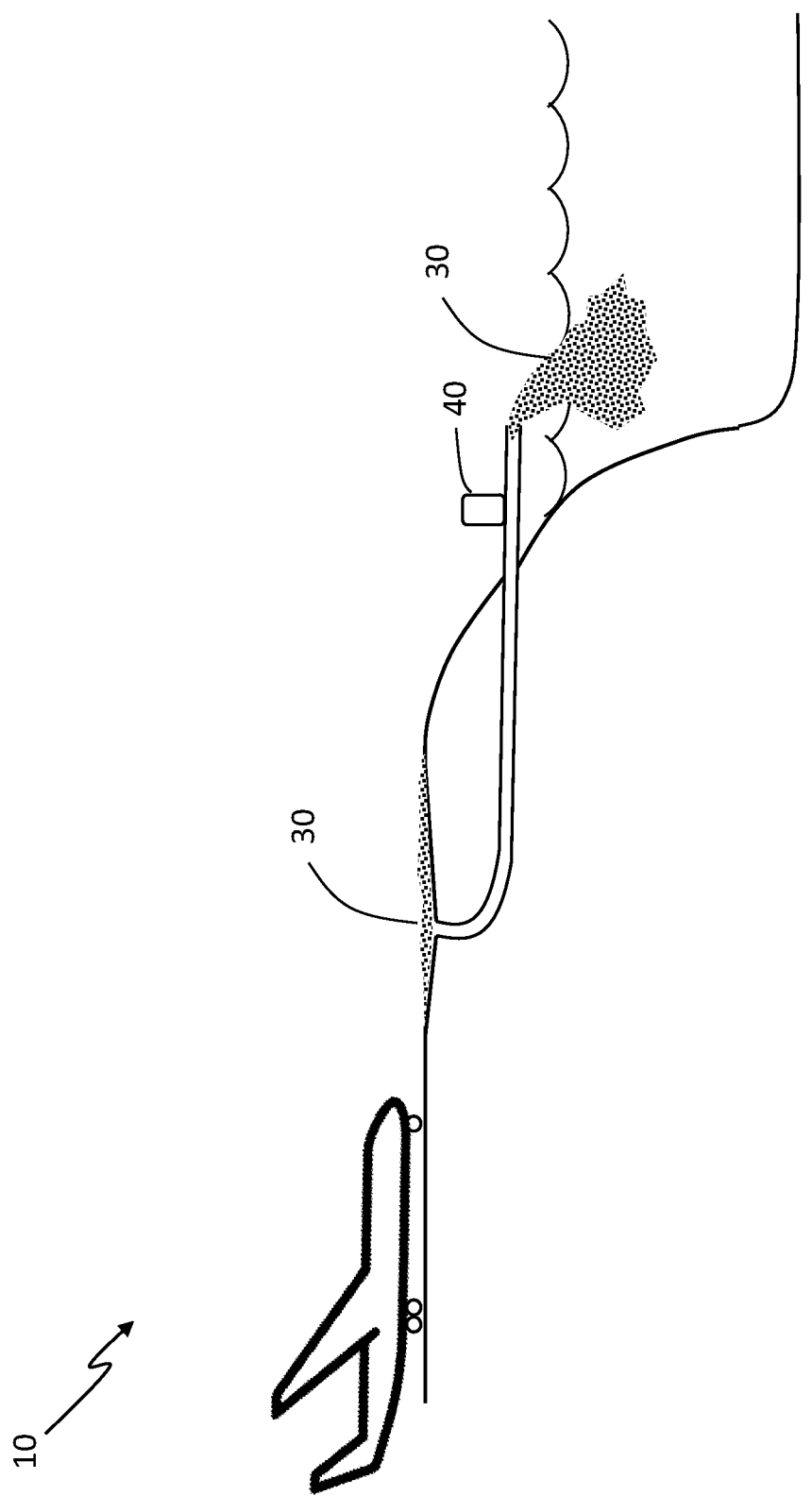
FIG. 6 is a diagrammatical cross-sectional view illustration of an application of the system for material composition detection of FIGS. 1-2, in accordance with embodiments of the present disclosure.

FIGS. 5-6 illustrate two of the numerous possible applications of the system 10. In FIG. 5, the vessel 20 is a pipeline with fluid flowing in direction 22. As the fluid composition 30 is detected within the vessel 20 by one or more transducers 40, the system 10 may control, either automatically or manually, a valve 62 which is positioned along the pipeline, to separate the materials within the vessel 20 as desired. For instance, it can separate the fluid composition 30 from the pure fluids 32, 34 positioned before and after the fluid composition 30, such that the fluid composition 30 can be separated from the pure fluids 32, 34. Thus, in this example, the valve 62 may be left open during use of the vessel 20 until the fluid composition 30 is detected, such that the fluid 32 which precedes the fluid composition 30 can continue along the main path of the vessel 20. When the fluid composition 30 is calculated to arrive at the valve 62, the valve 62 may be closed (as depicted in FIG. 5) to divert the fluid composition 30 along a secondary path 26 of the vessel 20 such that it can be separated from the first and second fluids 32, 34. For instance, the fluid composition 30 may be moved to a separate holding facility or area where the fluid composition 30 can be processed, refined, or otherwise used. Once the system 10 determines that the fluid composition 30 has fully exited the vessel 20, the valve may be actuated to prevent the fluid from entering the secondary path 26, such that it continues along the pipeline.

FIG. 6 depicts an exemplary application of the system 10 where the system 10 can be used to detect contamination in settings involving fluids. As depicted, the system 10 can detect contamination in run-off of fluid or liquid from a particular setting, such as an airport or a similar commercial or industrial facility. For example, many airports in cold climates utilize de-icing chemicals to prevent the buildup of ice on an aircraft. This de-icing chemical may collect on the tarmac of the airport and become blended or mixed with rainwater or snowmelt. When this blend of materials is removed from the tarmac through the drainage system, e.g., a network of subterrain pipes and collection vessels which often lead to a low point, such as a body of water, the presence of the de-icing material with the rain or snowmelt may contaminate the eventual collection point for the fluid.

The system 10 can be used to prevent environmental contamination by detecting the fluid identity of the fluid composition 30 as it is being expelled from the drainage system. For instance, the system 10 may utilize one or many transducers 40 which are positioned near an exit of the drainage system and are configured to generate an alarm or otherwise take action, e.g., shut a valve or diver the fluid, if a fluid composition of a particular identity is detected. It may be possible for limits to be set with the system 10, such that rain runoff with 3% or less contamination is allowed to be expelled from the tarmac, but contamination greater than 3% activates an alarm. Such a use of the system 10 may be able to prevent environmental contamination or other contamination before it begins, or lessen the impact of contamination by detecting it early.

It is noted that this example of FIG. 6 is one of many different possible scenarios where the system 10 can be used to prevent or indicate an environmental or other contamination, and all such scenarios, settings, and uses are considered within the scope of the present disclosure. This includes, for instance, use in industrial or commercial facilities utilizing chemicals, use in residential settings, military uses, and other settings where the detection of fluid contamination is desired. For instance, in one example, the system 10 can be used with analyzing oil used in steel production. As steel is being cut or manipulated, the oil is used for various processing reasons, such as for lubrication, to keep oxidation down, and not have metal particulate escape. It is desired to reuse the oil, but at a certain point, the oil is not suitable to be reused. Thus, the system can be used to identify when the oil is no longer usable.

Figure 7:
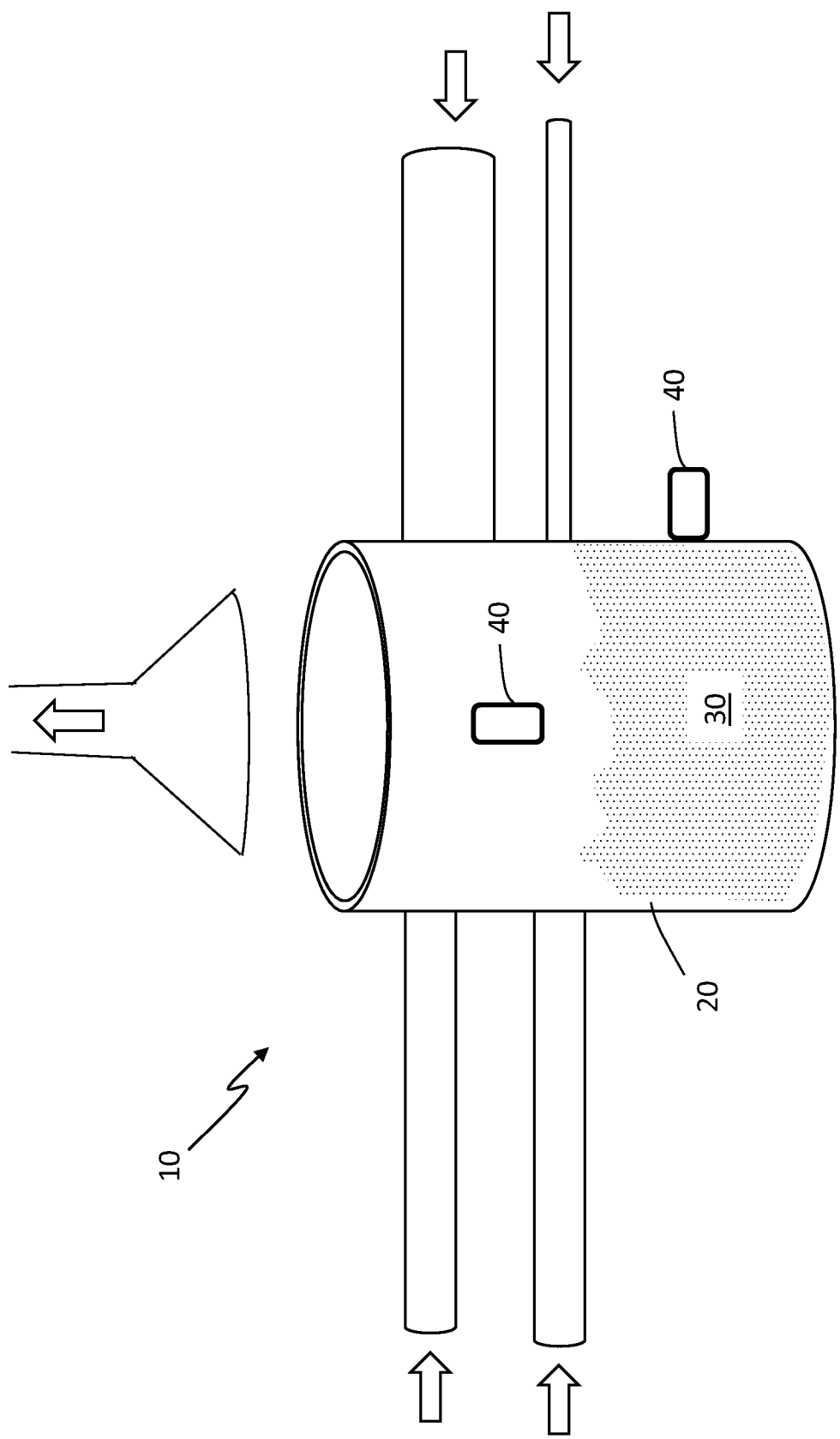
FIG. 7 is a diagrammatical view illustration of an application of the system for material composition detection of FIGS. 1-2, in accordance with embodiments of the present disclosure.

In a similar example, FIG. 7 is a diagrammatical view illustration of an application of the system 10 of FIGS. 1-2, in accordance with embodiments of the present disclosure. Specifically, FIG. 7 depicts the use of the system 10 in a static environment, such as a food processing environment where various fluid substances are moved through pipework to a vessel 20. Similar to as described previously, the system 10 can utilize one or more transducers 40 which are positioned on or proximate to the vessel 20, which detect the material identity of the fluid composition 30 within the vessel 20. As fluids are deposited into the vessel 20, the system 10 may continuously monitor the fluid composition 30 to determine when the mixture has achieved the desired composition, which can then be communicated to a control unit or a human individual, such as through the use of notifications, alarms, visual or auditory displays, or similar techniques. Similarly, the system 10 can also be used to determine a composition when fluid materials are removed from the fluid composition 30. For instance, if a food product is evaporated or boiled to remove water, the system 10 can determine when the desired amount of water has been removed from the fluid composition 30.

There are multiple applications in many industries where the system 10 can provide benefits when there is a transition between two or more materials, often fluids, which can be mixed or blended, and in some situations, which can chemically react. Mixture properties can be predicted or estimated by the system 10 by computing of the blend components volume from their densities. In case of static blending, it may be possible to use predictive algorithms based on simple analytic models or based on artificial intelligence (AI) to predict when complete transition from one fluid to another will be achieved.

It may also be possible to identify a first material and then estimate another material within the first material from a list of likely or known materials. For example, if the first material is diesel fuel, it may be possible to easily identify a likely contaminant within the diesel fuel. It is further noted that measuring the rate of change to estimate the identification of the second material can be achieved by monitoring the temperature dependent properties of the material, and need to be aware of temperature changes for more accurate estimate of time frame.

Blend analysis can be extended to include blending and certain chemical reaction process monitoring as well. As with a static blend properties approach, it may be possible to handle a dynamic transition from one fluid to a second fluid where there is no chemical reaction in a flow situation, such as when both materials are blending in a pipeline. During the transition period, the volume of one fluid may have a cross-sectional shape along a diagonal of a pipeline, such as is shown in FIGS. 3-4. Where there is a chemical reaction in the blended fluids, analysis of the fluid identity or changes of the fluid composition may require the use of computer processing, and in addition may include methods such as machine learning or AI.

Material in a blend can be recognized or measured separately not requiring prior knowledge of their properties. This method can be used to estimate properties of static or dynamic blends or multiple materials.

FIG. 8 is a flowchart 100 illustrating a method for material composition detection, in accordance with embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a quantity of a fluid composition is held or transported within a vessel, the fluid composition having at least a first fluid and a second fluid. At least one acoustic signal is emitted into the vessel with at least one acoustic transducer positioned on an exterior sidewall of the vessel (block 104). Using a processor of a computerized device in communication with the at least one acoustic transducer, a metric of a property of the first fluid is determined based on a first signal of the at least one acoustic transducer (block 106). Using the processor of a computerized device, a metric of a property of the second fluid is determined based on a second signal of the at least one acoustic transducer (block 108). Using the processor of the computerized device, a metric of a property of the fluid composition at a point in time is determined based on the metrics of the first and second fluids, and at least a determinable volume of at least a portion of the vessel (block 110). Using the processor of the computerized device, a material identity of the fluid composition at the point in time is determined based on the property of the fluid composition (block 112). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for material composition detection, the system comprising:
   a vessel holding or transporting a quantity of a fluid composition therein, the fluid composition having at least a first fluid and a second fluid;
   at least one acoustic transducer positioned on an exterior sidewall of the vessel; and
   a computerized device having a processor, the computerized device in communication with the at least one acoustic transducer, wherein the computerized device is configured to operate the at least one acoustic transducer to:
      determine at least one metric of a property of the first fluid based on a first signal of the at least one acoustic transducer,
      determine at least one metric of a property of the second fluid based on a second signal of the at least one acoustic transducer,
      determine at least one metric of a property of the fluid composition at a point in time based on the metrics of the first and second fluids, and at least a determinable volume of at least a portion of the vessel, and
      determine a material identity of the fluid composition at the point in time.

2. The system of claim 1, wherein the at least one acoustic transducer further comprises two or more acoustic transducers positioned at different locations along the vessel.

3. The system of claim 1, wherein the vessel further comprises a pipeline holding or transporting the quantity of a fluid composition therein.

4. The system of claim 1, further comprising a pump configured to control a movement of the composition of fluid within the vessel, wherein the pump is in communication with the at least one acoustic transducer.

5. The system of claim 1, wherein the at least one metric of the property of the first fluid and the second fluid further comprises at least one of: density, weight, acoustic velocity, temperature, resonance feature, attenuation, impedance, absorption spectra, material density measurements, mass, pressure, or volume.

6. The system of claim 1, wherein the first and second signals are emitted by the at least one transducer at intervals of time.

7. The system of claim 1, wherein the computerized device is configured to operate the at least one acoustic transducer to determine the material identity of the fluid composition as a concentration of the first and second fluids.

8. The system of claim 1, further comprising at least one valve in fluid communication with the vessel and positioned between two or more paths of the vessel, wherein the at least one valve is controlled by the computerized device based on the determined material identity of the fluid composition.

9. A system for material composition detection, the system comprising:
   a vessel containing a quantity of a material composition therein, the material composition having at least a first material and a second material;
   at least one acoustic transducer positioned on an exterior sidewall of the vessel; and
   a computerized device having a processor, the computerized device in communication with the at least one acoustic transducer, wherein the computerized device is configured to operate the at least one acoustic transducer to:
      determine at least one metric of a property of the first material based on a first signal of the at least one acoustic transducer,
      determine at least one metric of a property of the second material based on a second signal of the at least one acoustic transducer,
      determine at least one metric of a property of the material composition at a point in time based on the metrics of the first and second materials, and at least a determinable volume of at least a portion of the vessel, and
      determine wherein a material identity of the material composition at the point in time.

10. The system of claim 9, wherein the at least one acoustic transducer further comprises two or more acoustic transducers positioned at different locations along the vessel.

11. The system of claim 9, wherein the at least one metric of the property of the first material and the second material further comprises at least one of: density, weight, acoustic velocity, temperature, resonance feature, attenuation, impedance, absorption spectra, material density measurements, mass, pressure, or volume.

12. The system of claim 9, wherein the at least one transducer is configure to emit the first and second signals at intervals of time.

13. The system of claim 9, wherein the material identity of the material composition is determined as a concentration of the first and second materials.

14. A method for material composition detection, the method comprising:
   holding or transporting a quantity of a fluid composition within a vessel, the fluid composition having at least a first fluid and a second fluid;
   emitting at least one acoustic signal into the vessel with at least one acoustic transducer positioned on an exterior sidewall of the vessel; and
   determining, using a processor of a computerized device in communication with the at least one acoustic transducer, at least one metric of a property of the first fluid based on a first signal of the at least one acoustic transducer;
   determining, using the processor of a computerized device, at least one metric of a property of the second fluid based on a second signal of the at least one acoustic transducer;
   determining, using the processor of the computerized device, at least one metric of a property of the fluid composition at a point in time based on the metrics of the first and second fluids, and at least a determinable volume of at least a portion of the vessel; and
   determining, using the processor of the computerized device, a material identity of the fluid composition at the point in time based on the property of the fluid composition.

15. The method of claim 14, further comprising positioning two or more acoustic transducers at different locations along the vessel.

16. The method of claim 14, wherein the vessel further comprises a pipeline, and further comprising: transporting the quantity of a fluid composition within the pipeline.

17. The method of claim 14, further comprising controlling a movement of the composition of fluid within the vessel with a pump, wherein the pump is in communication with the at least one acoustic transducer.

18. The method of claim 14, wherein the at least one metric of the property of the first fluid and second fluid further comprises at least one of: density, weight, acoustic velocity, temperature, resonance feature, attenuation, impedance, absorption spectra, material density measurements, mass, pressure, or volume.

19. The method of claim 14, further comprising determining the material identity of the fluid composition as a concentration of the first and second fluid.

20. The method of claim 14, further comprising: separating the first fluid from the second fluid with at least one valve in fluid communication with the vessel, the at least one valve being positioned between two or more paths of the vessel, wherein the at least one valve is controlled by the computerized device based on the determined material identity of the fluid composition.

* * * * *